L. IVERSEN.
COMPRESSOR UNLOADER.
APPLICATION FILED JUNE 9, 1913.
1,122,395.
Patented Dec. 29, 1914.
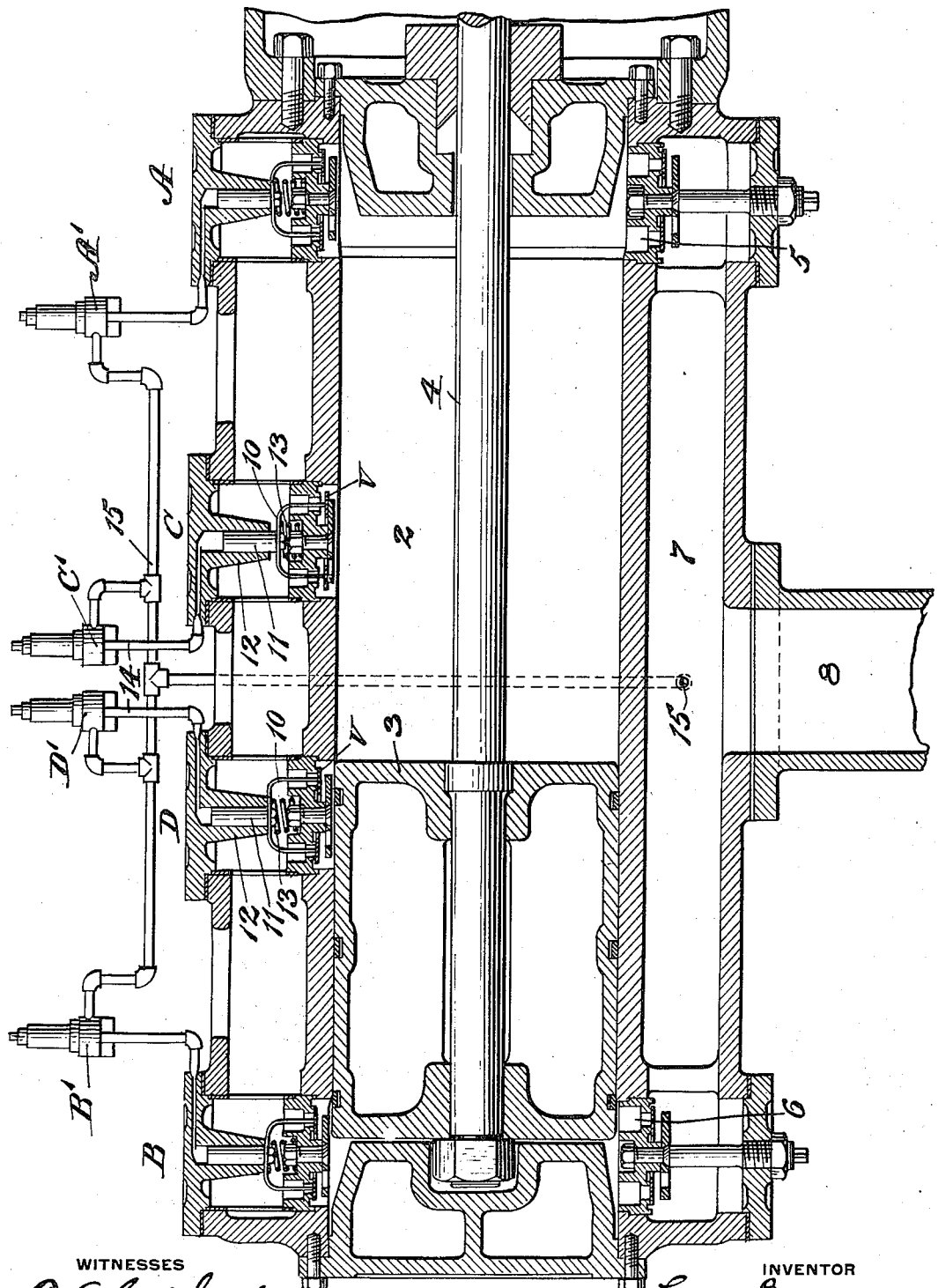
WITNESSES
INVENTOR

UNITED STATES PATENT OFFICE.

LORENZ IVERSEN, OF WEST HOMESTEAD, PENNSYLVANIA.

COMPRESSOR-UNLOADER.

1,122,395.  Specification of Letters Patent.  Patented Dec. 29, 1914.

Application filed June 9, 1913. Serial No. 772,520.

*To all whom it may concern:*

Be it known that I, LORENZ IVERSEN, a citizen of the United States, and resident of West Homestead, in the county of Allegheny and State of Pennsylvania, have invented certain new and useful Improvements in Compressor-Unloaders, of which the following is a specification.

The object of this invention is to provide simple and highly efficient means for proportioning the load to the demands upon the compressor, provision being had for either partially or completely unloading the machine by gradually decreasing the effectiveness of the pumping strokes as the pressure at the discharge approaches a predetermined maximum, the partially or wholly inactive strokes again becoming active with increased demand upon the machine. Thus, the whole, or one-half or any larger or smaller fractional part of each stroke of the piston may be rendered ineffective, the unloading being accomplished gradually and the machine saved the injurious shock resulting from a sudden and complete unloading.

It is characteristic of the invention that the relief valves open to the atmosphere so that the churning resulting from partially or wholly idle strokes is accomplished with fresh cool air and the machine is prevented from heating.

The accompanying drawing is a diagrammatic sectional elevation of a compressor embodying the invention.

Referring to the drawings, 2 designates the cylinder, 3 the piston, and 4 the piston operating rod of a compressor. As illustrated, the machine is double acting, being provided with inwardly opening valves A and B communicating with opposite ends of the cylinder, and discharge valves 5 and 6 for establishing communication between the opposite cylinder ends and the cylinder discharge 7, a pipe or header 8 passing the compressed air to a receiver or other storing or pressure utilizing means, not shown. The cylinder is here shown provided with two intermediate inwardly opening valves C and D so spaced between the ends of the cylinder that when either of said valves is open it renders ineffective one-half the stroke of the piston in one direction. Valves A and B may be the usual inlet valves, or two of such valves if there is more than one inlet at each end. In the present adaptation each inlet or relief valve is provided with a device for holding it open. The holding device, for which no novelty is claimed, may consist of curved arms 10 adapted when projected from normal position to engage the valve plate V and hold it open, the arms being secured to a piston 11 in cylinder 12, a spring 13 holding arms 10 and the piston normally retracted. Pipe 14 is adapted to establish communication between each cylinder 12 and a pipe 15 in which the pressure at the discharge side of the machine is maintained, being here shown connected to the cylinder discharge 7, though it will be understood that it is immaterial where or how the connection is made so long as the effective pressure is communicated to cylinders 12. Each of the cylinder connections 14 is provided with a pressure regulating device of which various forms are known in the art.

Operation: If pressure of approximately 100 pounds is to be maintained, the regulator C' for valve C may be set to open at say 98 pounds, the regulator D' for valve D at 100 pounds, B' for valve B at 102 pounds, and A' for valve A at 104 pounds. If the demands upon the compressor are such that the maximum pressure is sustained with only one-half of each alternate stroke of the piston effective, then valve C is held open, as shown in the drawing, by a pressure of 98 pounds, and renders ineffective the first half of the stroke of the piston when moving to the right, the latter half of that stroke and the full stroke in the opposite direction being effective. If the discharge pressure attains 100 pounds notwithstanding the open valve C, then valve D opens and renders ineffective one-half of the stroke to the left, and with valves C and D both open, only one-half of each stroke is effective. If the unloading thus accomplished is not sufficient the increase of discharge pressure opens valve B at 102 pounds, thus leaving only one-fourth of each alternate stroke active, or when the piston is moving from valve C toward valve A. If there are no demands upon the compressor and the pressure rises to 104 pounds, then valve A is opened with the result that no portion of either stroke is effective, the air simply churning in and out through the valves which are open to the atmosphere.

The relief valves may be variously constructed and variously positioned at and between the cylinder ends in any desired number and in such location as to relieve all or any fractional part or parts of the compressing strokes. In machines of such size as to require a plurality of inlet valves at each end of the cylinder. only such number need be utilized for unloading as are required to prevent accumulation of pressure. Nor is the invention restricted to the use of only a single valve at each intermediate position, as it is obvious that as many may be utilized as may be necessary to automatically proportion the load to the demands upon the machine.

I claim:—

1. The combination of a compressor cylinder, a relief valve in communication with the cylinder intermediate the cylinder ends, automatic means for operating the relief valve when predetermined cylinder discharge pressure has been attained, and a piston within the cylinder and adapted to close the communication between the cylinder and valve during a portion of the piston stroke.

2. The combination of a compressor cylinder, a relief valve in communication with the cylinder intermediate the cylinder ends, means actuated by cylinder discharge pressure for operating the valve when predetermined cylinder discharge pressure has been attained, and a piston within the cylinder and adapted to close the communication between the cylinder and valve during a portion of the piston stroke.

3. The combination of a compressor cylinder and piston, a plurality of relief valves in communication with the cylinder at different points in the length of the latter, and means actuated by different cylinder discharge pressures for operating the respective valves.

4. The combination of a compressor cylinder, end and intermediate relief valves in communication, respectively, with the cylinder at its ends and between its ends, means actuated by different cylinder discharge pressures for operating the respective valves, and a piston within the cylinder and adapted during predetermined portions of its strokes to close the communication with the intermediate relief valves.

5. The combination of a compressor cylinder and piston, end and intermediate relief valves in communication, respectively, with the cylinder at its ends and between its ends, and means actuated by different cylinder discharge pressures for opening the respective valves with the intermediate valves adapted to open under lower pressures than the end valves.

6. The combination of a compressor cylinder, an automatically closing relief valve in communication therewith intermediate the cylinder ends, a device operated by fluid pressure created in the cylinder for opening said valve, and a piston within the cylinder and adapted to close communication with the valve during a portion of the piston stroke.

7. The combination of a compressor cylinder, a relief valve in communication therewith intermediate the cylinder ends and adapted to open against cylinder pressure, a device operated by predetermined fluid pressure created in the cylinder for opening said valve and for holding it open while such pressure is maintained or exceeded, and a piston within the cylinder and adapted to close communication with the valve during a portion of the piston stroke.

8. The combination of a compressor cylinder and piston, a plurality of automatically closing relief valves in communication with the cylinder at different points in the length thereof, and devices—one for each valve—operated, respectively, by different predetermined pressures created in the cylinder for opening said valves.

9. The combination of a compressor cylinder and piston, inlet valves for the cylinder with certain of said valves in communication with the end portions of the cylinder and with other inlet valves positioned intermediate the cylinder ends to render ineffective predetermined portions of the piston stroke when predetermined pressure has been attained in the cylinder discharge, pressure actuating means for each inlet valve for holding the same open, and means for communicating varied and predetermined pressures from the cylinder discharge to the respective inlet valves.

In testimony whereof I affix my signature in presence of two witnesses.

LORENZ IVERSEN.

Witnesses:
J. M. NESBIT,
F. E. GAITHER.